US007355365B2

(12) United States Patent
Platzkoester

(10) Patent No.: US 7,355,365 B2
(45) Date of Patent: Apr. 8, 2008

(54) FUNCTIONAL UNIT OF A MOTOR VEHICLE

(75) Inventor: Andreas Platzkoester, Wuppertal (DE)

(73) Assignee: Brose Schliesssysteme GmbH & Co. KG, Wuppertal (DE)

( * ) Notice: Subject to any disclaimer, the term of this patent is extended or adjusted under 35 U.S.C. 154(b) by 0 days.

(21) Appl. No.: 11/381,616

(22) Filed: May 4, 2006

(65) Prior Publication Data

US 2006/0249974 A1 Nov. 9, 2006

(30) Foreign Application Priority Data

May 9, 2005 (DE) .................. 20 2005 007 536 U

(51) Int. Cl.
*B62D 25/10* (2006.01)

(52) U.S. Cl. ......................... 318/652; 318/626; 296/76

(58) Field of Classification Search ........ 318/264–266, 318/286, 466–468, 626, 661, 663, 652; 296/76
See application file for complete search history.

(56) References Cited

U.S. PATENT DOCUMENTS 4,689,535 A * 8/1987 Tsunoda et al. ............ 318/443
5,184,050 A * 2/1993 Harada et al. .............. 318/467
5,852,996 A * 12/1998 Nakamura et al. .......... 123/399
5,986,421 A * 11/1999 Fukazawa et al. .......... 318/466
6,112,583 A * 9/2000 Yamamura ................... 73/116
6,114,820 A * 9/2000 Nishigaya ................... 318/466
6,343,437 B1 * 2/2002 Hoffmann et al. ............ 49/363
6,400,278 B1 6/2002 Weyerstall et al.
6,448,760 B1 9/2002 Neumann et al.
6,578,437 B1 6/2003 Moerbe
6,590,357 B2 * 7/2003 Okamoto .................... 318/467
2005/0083039 A1 4/2005 Kullmann et al.

FOREIGN PATENT DOCUMENTS

DE 199 44 554 A1 3/2001
EP 1 252 491 B1 10/2002

* cited by examiner

*Primary Examiner*—Bentsu Ro
(74) *Attorney, Agent, or Firm*—David S. Safran

(57) ABSTRACT

A functional unit of a motor vehicle tat has at least one adjustable functional element, a control means for controlling and/or for monitoring the position of the functional element, an angle sensor coupled to the functional element for determining the position thereof, a stator and a rotor that is pivotable relative to the stator around an axis of the angle sensor, the angle sensor producing an output signal which corresponds to a respective position of the rotor relative to the stator and the output signal being supplied to the control means, in which the angle sensor is a magneto-resistance angle sensor, the stator has evaluation electronics and the rotor has a permanent magnet arrangement. The functional element can be such motor vehicle elements as a pivotable rear hatch, a pivotable trunk lid, a pivotable hood and a pivotable or sliding door, a motorized seat adjustment, and a motorized window raiser.

16 Claims, 8 Drawing Sheets

FUNCTIONAL UNIT OF A MOTOR VEHICLE

BACKGROUND OF THE INVENTION

1. Field of the Invention

The invention relates to a functional unit of a motor vehicle with at least one adjustable functional element, a control means for controlling and/or for monitoring the position of the at least one functional element, an angle sensor which is coupled to the at least one functional element for determining the position thereof a stator and a rotor is pivotable relative to the stator around an axis of the angle sensor, the angle sensor producing an output signal which corresponds to a respective position of the rotor relative to the stator and the output signal being supplied to the control means.

2. Description of Related Art

Modern motor vehicles are equipped with a host of the functional units under consideration. Examples include arrangements with pivoting rear hatches, trunk lids, hoods, side doors, sliding doors, seat adjustments, window raisers, or the like. Such a functional unit has at least one adjustable functional element for mechanical implementation of the respective function. Functional elements are, for example, actuating elements, push rods and ultimately also components which are to be optionally actuated, such as a rear hatch or the like. The functional unit can be made to be actuated manually or by a motor.

The known functional unit (German Patent Application DE 199 44 554 A1) underlying the invention comprises a motorized trunk lid which has a drive for motorized actuation of the trunk lid and a corresponding drive train. To control this functional unit, there is a control means. Furthermore, there is an angle sensor for determining the angular position of the functional element, here the trunk lid, which is coupled by control engineering to the control means. Such an angle sensor is generally equipped with a rotor which can be pivoted relative to a stator The angle sensor produces an output signal which corresponds to the respective position of the rotor relative to the stator.

The optimum design of the angle sensor in the known functional unit is decisive for its optimum control. However, the design often leads to problems, especially with respect to optimum use of the measurement range of the angle sensor. For example, if only a small part of the measurement range of the angle sensor is used due to poor design, this leads to inadequate resolution of the resulting measurement system with respect to the adjustment motion of the trunk lid.

SUMMARY OF THE INVENTION

A primary object of the present invention is to develop the known functional unit such that optimum detection of the position of the respectively relevant functional element is ensured.

The aforementioned object is achieved in a functional unit of a motor vehicle that has at least one adjustable functional element, a control means for controlling and/or for monitoring the position of the at least one functional element, an angle sensor which is coupled to the at least one functional element for determining the position thereof a stator and a rotor that is pivotable relative to the stator around an axis of the angle sensor, the angle sensor producing an output signal which corresponds to a respective position of the rotor relative to the stator and the output signal being supplied to the control means, in which the angle sensor is an MR angle sensor (magneto-resistance angle sensor), the stator has evaluation electronics and the rotor has a permanent magnet arrangement.

The consideration of making the angle sensor as a MR sensor (magneto-resistance angle sensor) is important For this purpose, the stator of the angle sensor has evaluation electronics and the rotor of the angle sensor has a permanent magnet arrangement.

The basic principle of a MR angle sensor is that the electrical conductivity of the electrical measurement conductor can be influenced by the application of a magnetic field to this measurement conductor. This effect is attributed to the Lorentz force. The measurement conductor here is assigned to the evaluation electronics and is permeated by the magnetic field of the permanent magnet arrangement.

Depending on the position of the rotor which has the permanent magnet arrangement, the aforementioned angle can change; as a result, this leads to a change of the electrical resistance of the measurement conductor. Thus, the angle of the rotor relative to the stator can be easily determined from the electrical resistance of the measurement conductor. Contact between the rotor and stator is therefore not necessary; this leads fundamentally to minimization of wear.

If suitable bridge circuits are used for evaluation of the electrical resistance of the measurement conductor, in the MR angle sensor primarily the above described angle between the magnetic flux density and the main direction of the electrical current is important. Thus, the sensor is largely independent, for example, on fluctuations in the magnetic flux density of the permanent magnet arrangement which can arise among others due to temperature fluctuations. This leads altogether to an especially durable arrangement.

Furthermore, it is especially advantageous if the flux density produced by the permanent magnet arrangement is so high that the measurement conductor is always in magnetic saturation. Then the interference susceptibility is especially low, since fluctuations in the magnetic flux density do not in turn influence the output signal of the angle sensor.

It is especially advantageous that, with the MR angle sensor, the direct measurement of the absolute position of the rotor is ensured. Depending on the configuration of the evaluation electronics, an analog or digital output signal is produced which provides information about the position of the rotor. Counting logic as is necessary, for example, in incremental synchro-transmitters can be omitted here. Furthermore, it is pointed out that, for a suitable design of the evaluation electronics, high resolution can be achieved over the entire measurement range of the MR angle sensor.

The physical principles for a MR angle sensor can be found in the technical literature (for example, *Elements of applied Electronics*, Erwin Boehmer, 14th edition, Vieweg Verlag, Wiesbaden, 2004, p. 24, 25).

The aforementioned concept can be applied to all functional units of a motor vehicle. The focus in the following is, first of all, on the motorized rear hatch of a motor vehicle. However, this should not be understood as limiting.

Basically, it is especially advantageous if a part of the measurement range of the angle sensor is covered as much as possible when the functional element is moved over its adjustment range. This leads to an especially high resolution of the resulting measurement system with respect to adjustment of the functional element. For this reason, in a preferred configuration, it is provided that the angle sensor is coupled to the functional element via a gearing arrangement. With it, a predetermined measurement range of the angle sensor can be assigned to the adjustment range of the functional element.

The basic consideration that the angle sensor is coupled to the functional element via a gearing arrangement is also subject matter which has independent importance.

The invention is explained in detail below with reference to the accompanying drawings which show three exemplary embodiments.

DETAILED DESCRIPTION OF THE INVENTION

Figure 1:
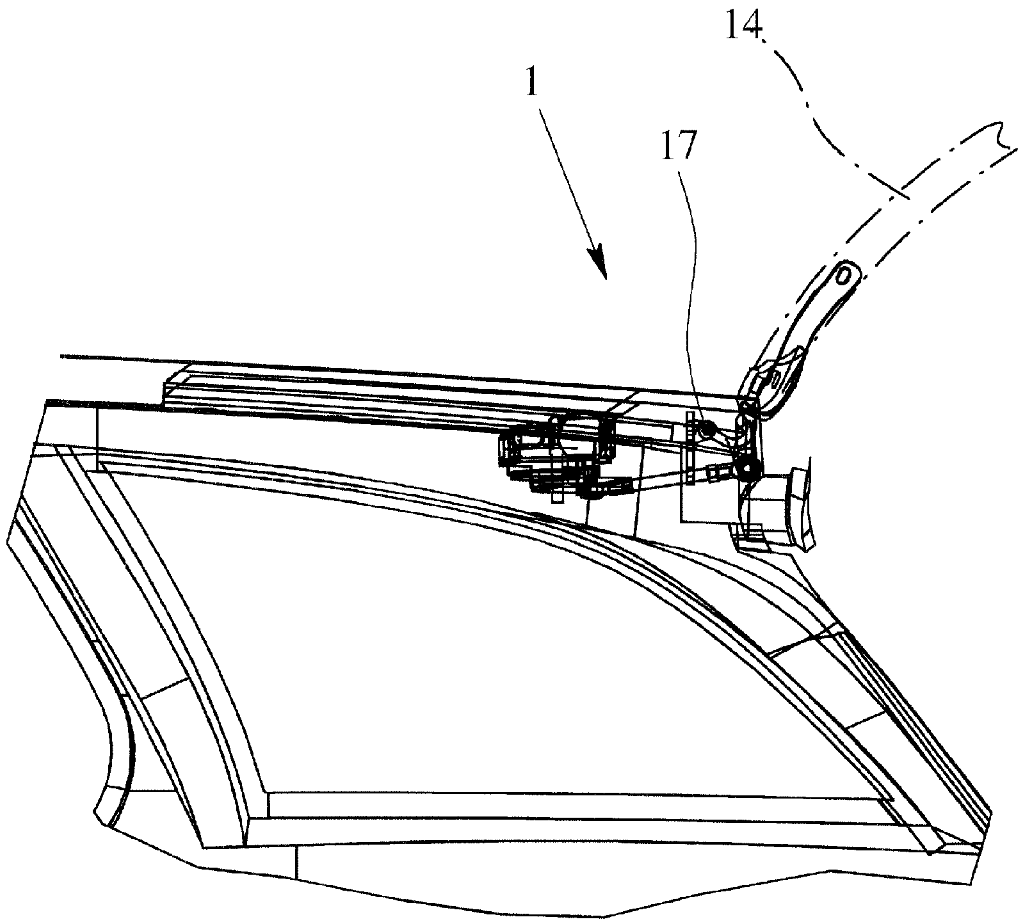
FIG. 1 shows the rear of a motor vehicle in a side view with a functional unit in accordance with the invention comprising a motorized rear hatch.

The functional units 1 shown in FIGS. 1 to 7 relate to a rear hatch arrangement of a motor vehicle; this should not be understood as limiting with respect to the application. When a rear hatch is discussed below, for example, a trunk lid or hood is equally intended. In general, the approach of the invention can also be applied to all conceivable functional units of a motor vehicle.

First of all, some general explanations on the functional unit in accordance with the invention are given.

The functional unit 1 has at least one movable functional element 2 which is used for mechanical implementation of the respective function. For a motorized rear hatch arrangement, this functional element is, for example, an actuating element which is still to be explained, a push rod and the rear hatch itself.

Furthermore, there is a control means 3 which is used for control and/or monitoring of the position of the functional element 2, and thus, of the functional unit 1. An angle sensor 4, which is coupled to the functional element 2 and by which the position of the functional element 2 can be determined, is assigned to the control means 3.

A stator 5 and a rotor 7 which can be pivoted around the angle sensor axis 6 relative to the stator 5 are assigned to the angle sensor 4. In this connection, the angle sensor 4 produces an output signal 8 which corresponds to the respective position of the rotor 7 relative to the stator 5 and which is shown by a broken line in FIG. 2. The output signal 8 is supplied to the control means 3 and is processed there accordingly.

Figure 6:
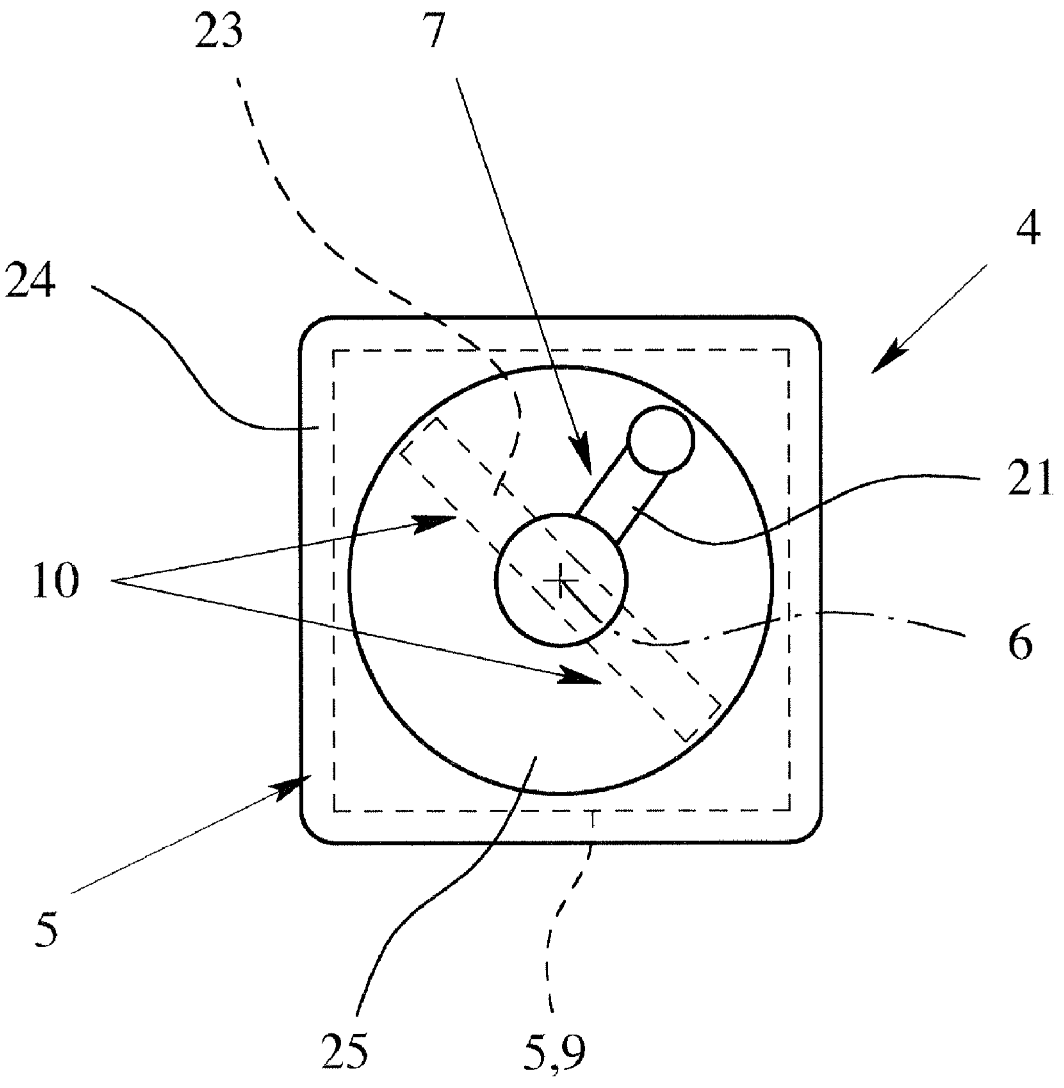
FIG. 6 shows an angle sensor of the functional unit in accordance with the invention.

In the illustrated exemplary embodiment, it is important that the angle sensor 4 is made as a MR angle sensor (magneto-resistance angle sensor) and that, for this purpose, the stator 5 has evaluation electronics 9 and the rotor 7 has a permanent magnet arrangement 10 (FIG. 6). The physical principles of the MR angle sensor were explained in the Background part of this specification.

The rotor 7 can be rotated relative to the stator 5 over a measurement range within which the angle sensor 4 produces the output signal. Fundamentally, the measurement range of the angle sensor 4 comprises at most an angular range of 360°. Depending on the configuration, it can also be provided that the measurement range of the angle sensor 4 comprises a measurement range of at most 180° or less.

Therefore, in the functional unit 1 shown in the drawings, the rear hatch arrangement can be actuated by a motor. For this purpose the functional unit 1 is equipped with a drive 11 having a drive motor 12 and an actuating element 13, the angle sensor 4 preferably being coupled directly to the drive 11. This leads to an altogether especially compact arrangement.

It can also be provided that the functional unit 1 operates completely manually, the respective functional element 2 then being simply monitored by the control means 3.

In the illustrated preferred exemplary embodiment, the functional unit 1 comprises a pivotable rear hatch 14 which can be actuated by a motor. The rear hatch construction by itself forms no part of this invention, and thus, a detailed explanation thereof is unnecessary and is omitted.

Figure 2:
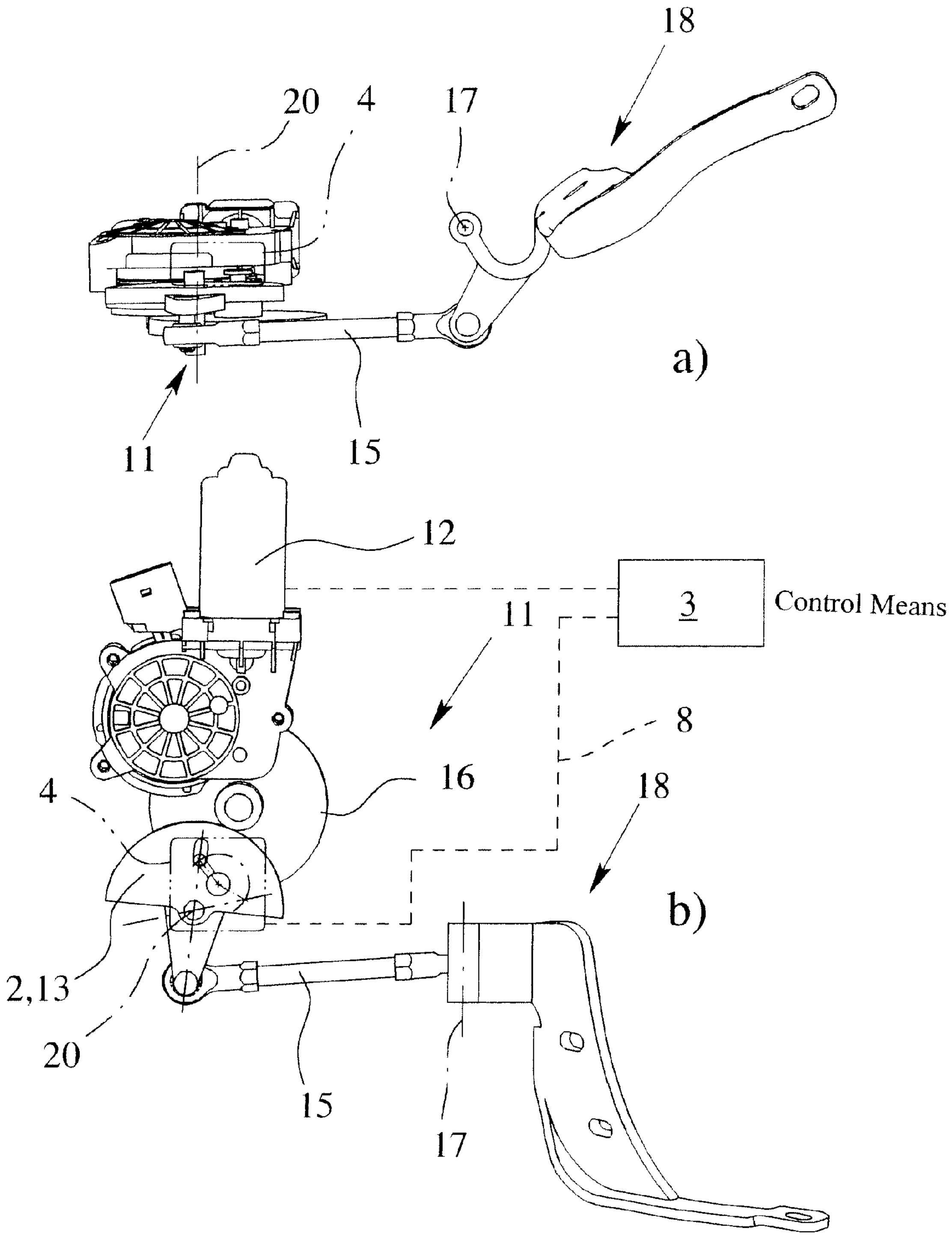
FIGS. 2*a* & 2*b* show the functional unit as shown in FIG. 1, partially dismounted, with the hatch opened, FIG. 2*a* being a side view and FIG. 2*b* being a top view.
Figure 3:
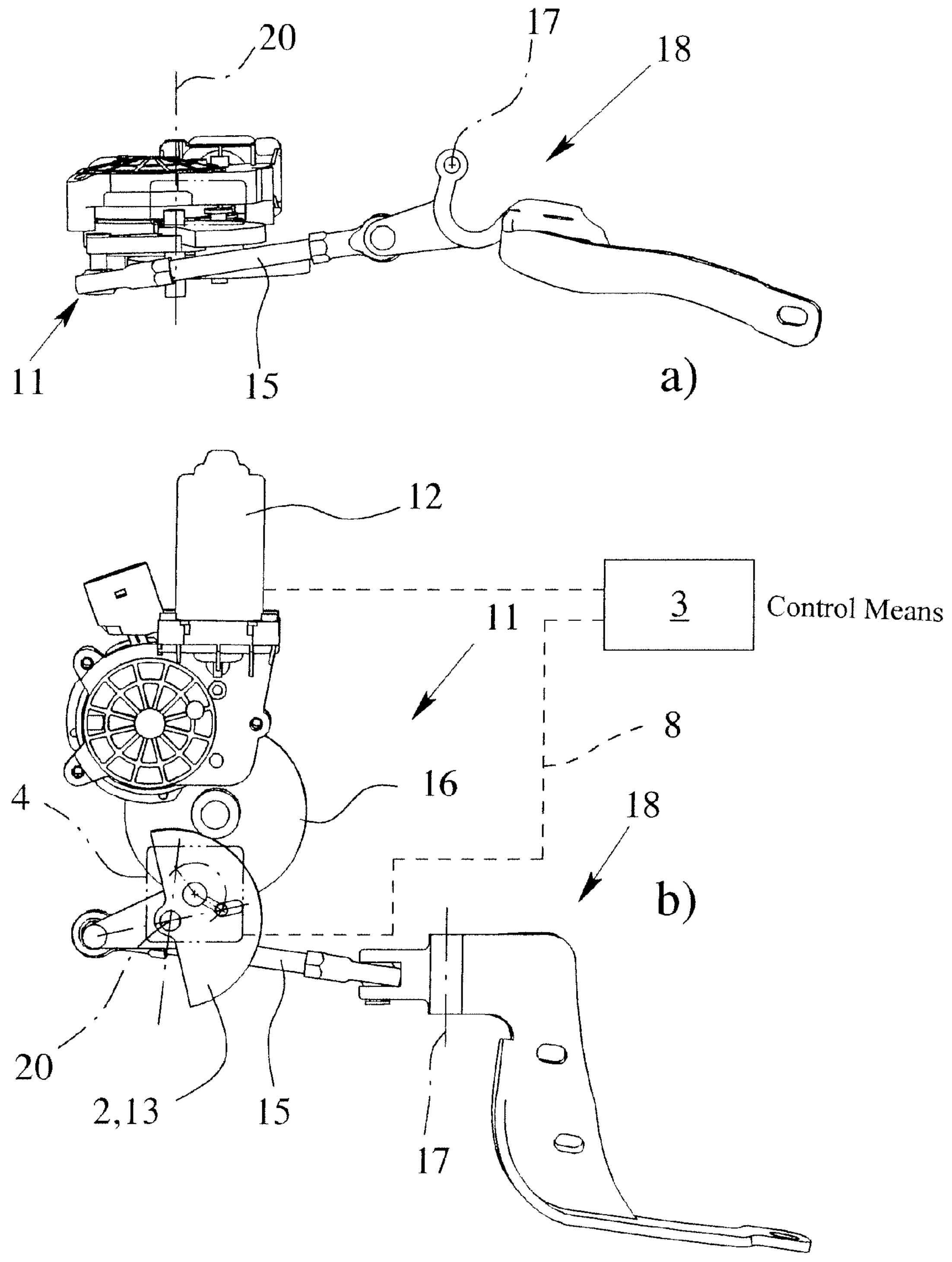
FIGS. 3*a* & 3*b* show the functional unit as shown in FIG. 1, partially dismounted, with the hatch closed, FIG. 2*a* being a side view and FIG. 2*b* being a top view.
Figure 4:
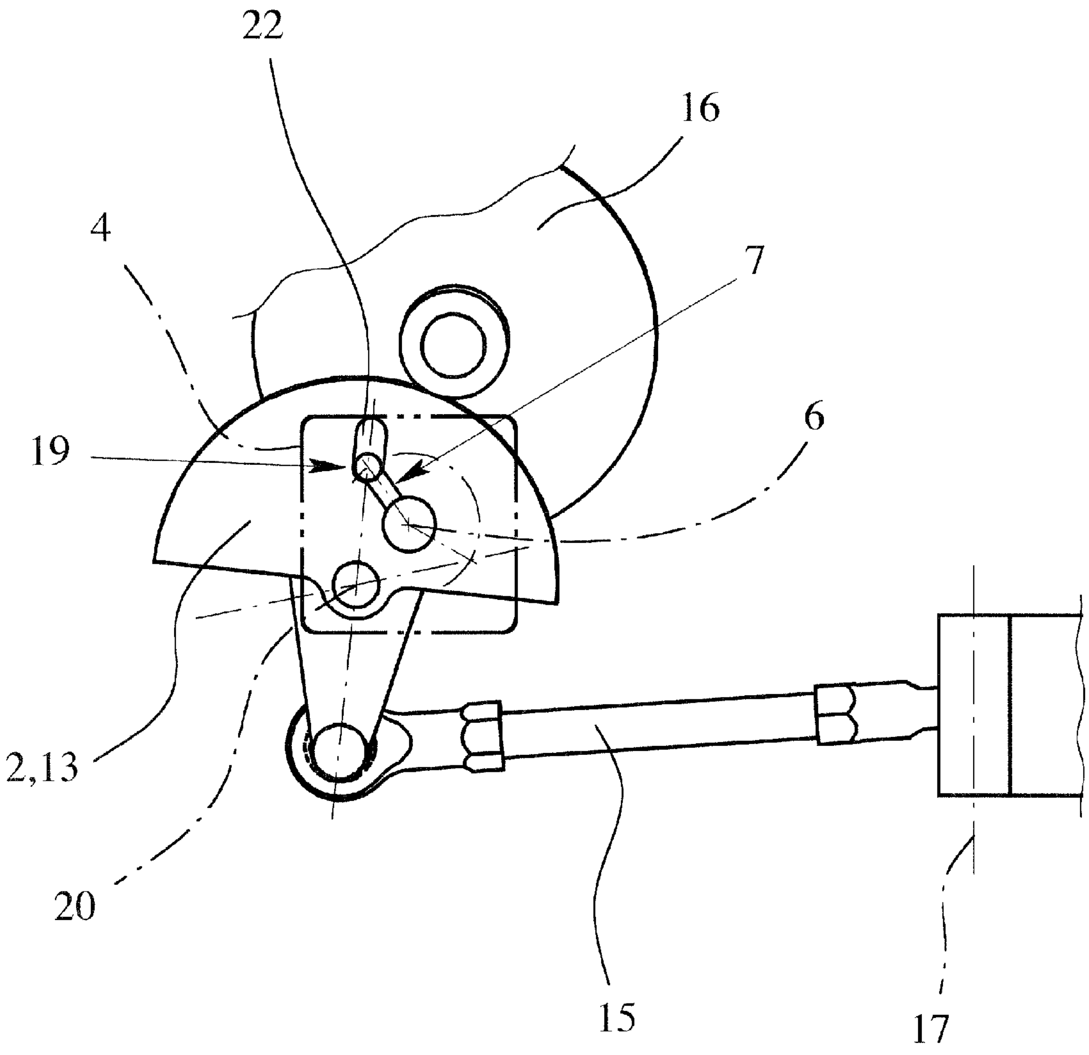
FIG. 4 is an extract of the representation as shown in FIG. 2*b*.
Figure 5:
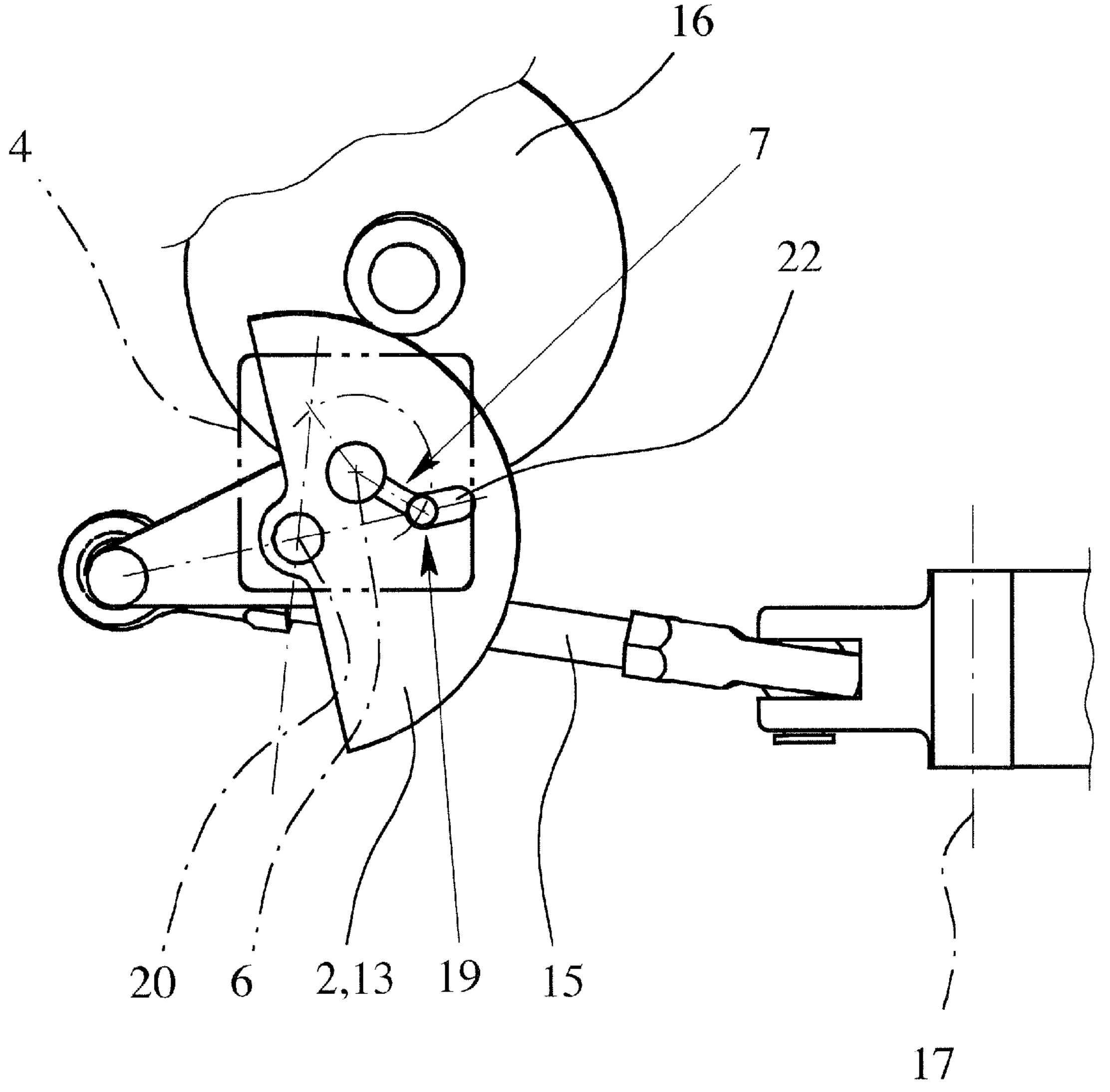
FIG. 5 is an extract of the representation as shown in FIG. 3*b*.

FIGS. 2, 3 show the drive motor 12 and a pivotable actuating element 13. A push rod 15 is coupled eccentrically to the actuating element 13 and engages the rear hatch 14 on its other end. A step-up wheel 16 is connected between the drive motor 12 and the actuating element 13. The push rod 15 is not coupled directly to the rear hatch 14, but is connected via a two-arm lever 18 which can be pivoted around a hatch axis 17.

Various possibilities are possible for linking the angle sensor 4. One possibility comprises coupling the rotor 7 to the functional element 2 with the stator 5 stationary. However, in certain applications, it can also be advantageous to couple the rotor 7 to the functional element 2 and the stator 5 to another adjustable functional element. Then, the angle sensor 4 detects the relative motion of one functional element 2 relative to the other functional element. Here, it becomes clear that, with respect to their arrangement within the functional unit, the stator 5 and the rotor 7 can be interchanged. This applies to all embodiments explained here.

In the illustrated preferred rear hatch arrangement, it is provided that the stator 5 of the angle sensor 4 is stationary and that the rotor 7 of the angle sensor 4 is coupled to the actuating element 13. Basically, it can also be provided, as described above, that to detect relative motion between the actuating element 13 and the push rod 15, the rotor 7 is coupled to the actuating element 13 and the stator 5 is connected to the push rod 15.

Figure 7:
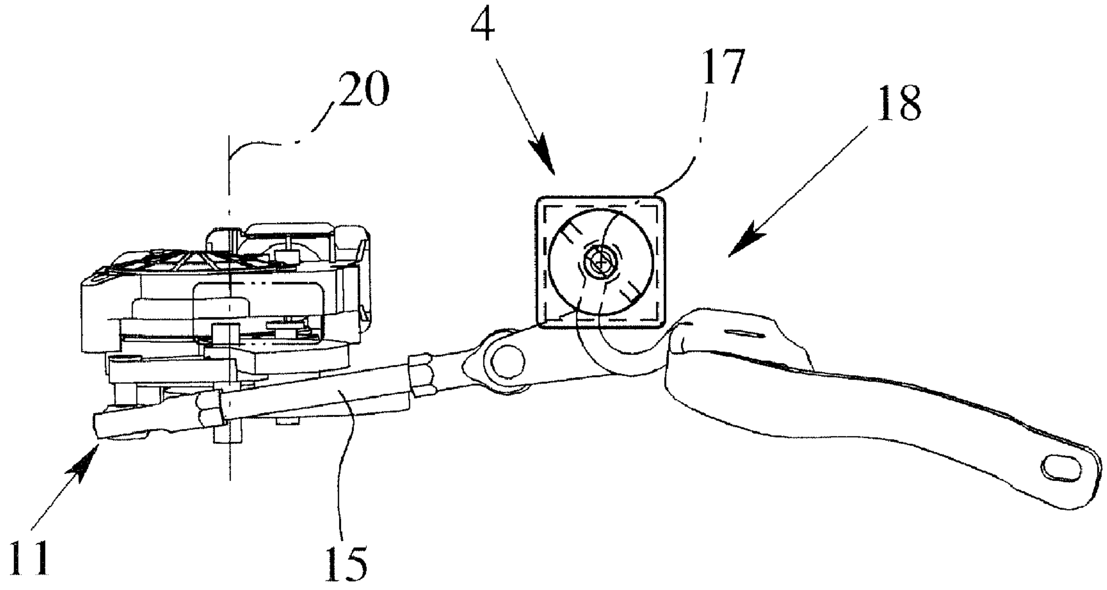
FIG. 7 shows another embodiment of a functional unit, partially dismounted, with the hatch opened in a side view.

It can also be advantageous to directly detect the position of the rear hatch 14. To do this, it is provided that the stator 5 is stationary and that the rotor 7 is coupled to the rear hatch 14 in the area of the hatch hinge. This is shown in FIG. 7.

In an especially preferred configuration, the angle sensor 4 is coupled to the functional element 2 via a gearing arrangement 19. This means that movement of the functional element 2, depending on the design of the gearing arrangement 19, is converted into a corresponding movement of the rotor 7 relative to the stator 5. By means of a suitable design of the gearing arrangement 19, it is possible to optimally use the measurement range of the angle sensor 4. The gearing arrangement 19 can operate as an rpm step-up or as rpm step-down transmission.

If it is considered that the functional element 2 can be adjusted over an adjustment range and that the rotor 7 can be moved relative to the stator 5 over a measurement range, the gearing arrangement 19 is preferably designed such that, when the functional element 2 is moved over its adjustment range, the rotor 7 covers at least a considerable part of the measurement range, and at maximum essentially, the entire measurement range.

Numerous versions are possible for the configuration of the gearing arrangement 19. One preferred version is shown by the illustrated exemplary embodiment.

The functional element 2 coupled to the angle sensor 4 in the aforementioned sense is the actuating element 13 of the drive 11 here. The functional element 2 can be pivoted around the functional element axis 20. The angle sensor axis 6 is spaced apart from the functional element axis 20 such that the movement of the functional element 2 by a certain angular amount causes displacement of the rotor 7 relative to the stator 5 by a certain angular amount.

In the illustrated, preferred exemplary embodiment, the rotor 7 is a lever 21 that has one end engaging the oblong hole 22 of the functional element 2, here therefore, of the actuating element 13. The lever 21 can assume all conceivable shapes here, and is not limited to the elongated lever shape shown as an example. What is important is simply that the lever 21 can be pivoted around the angle sensor axis 6 and has a point of application of force which is spaced apart from the angle sensor axis 6. It can be taken from FIG. 6 that, overall, the rotor 7 even has a shape which is round in cross section and in which the permanent magnet arrangement 10 is located.

The aforementioned spacing of the angle sensor axis 6 relative to the functional element axis 20, together with the aforementioned slot guide of the lever 21, performs the function of the described gearing arrangement 19. This results in that, when the functional element 2 is moved over an adjustment range of roughly 70°, the rotor 7 covers an angular range of roughly 155°. In this way, the measurement area of the angle sensor 4 which is, for example, 180°, is advantageously used.

Figure 8:
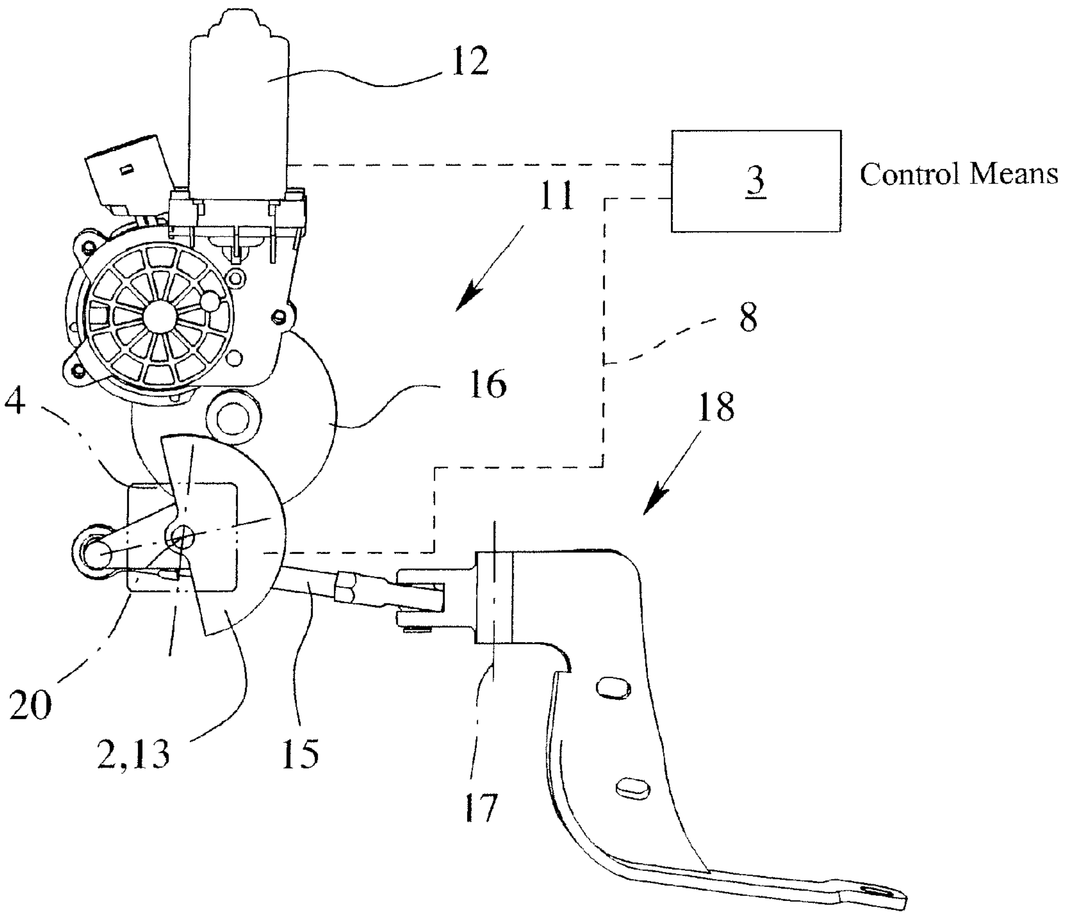
FIG. 8 shows another embodiment of a functional unit, partially dismounted, with the hatch opened in a top view.

It is pointed out that, in a structurally especially simple configuration, the arrangement of the angle sensor axis 6 can be provided in the functional element axis 20. Here, the angle sensor 4 is easily placed on the functional element axis 20 (FIG. 8). Then, the aforementioned effect of a gearing arrangement 19 is eliminated in favor of saving production costs.

Another possible configuration of the gearing arrangement 19 is outfitting the gearing arrangement 19 with a step-up gear wheel or an arrangement of step-up gear wheels. One application example for this is a motorized sliding door which has a cable drive. If the angle sensor 4 is assigned to the cable drum or the like and is coupled to it, the problem arises that the angle sensor 4 executes several complete revolutions upon actuation. Thus, determination of the absolute position by the angle sensor 4, which here has a maximum measurement range of 360°, is not possible. Therefore, to couple the angle sensor 4 to a sliding door, here to the cable drum or the like, there is at least one step-up gear wheel so that the rotor 7, relative to the stator 5, covers at most the measurement range of the angle sensor 4 when the sliding door moves from the opened position into the closed position and vice versa. The at least one step-up gear wheel forms the gearing arrangement 19 which operates as rpm step-down transmission.

FIG. 6 shows the basic structure of a MR angle sensor 4 viewed from the side, from which coupling to the functional element 2 takes place. The evaluation electronics 9 are located in the immediate vicinity of the permanent magnet arrangement 10, which comprises, here, an individual permanent magnet 23 which is pivotable around the angle sensor axis 6. The permanent magnet arrangement 10 is permanently connected to the rotor 7, here to the lever 21. Therefore, when the rotor 7 turns, the permanent magnet arrangement 10 pivots relative to the stator 5 around the angle sensor axis 6.

In an especially preferred configuration, the angle sensor 4 is equipped with an angle sensor housing 24 which holds the aforementioned evaluation electronics 9. Installation is made especially simple by the angle sensor housing 24 being made in at least two parts and by the parts of the angle sensor housing 24 being clipped to one another.

Basically, the rotor 7 can be made otherwise independent of the angle sensor 4, since the permanent magnet arrangement 10 produces a wireless coupling to the evaluation electronics 9. For example, the permanent magnet arrangement 10 can also be integrated into the functional element 2, for example injection-molded. Furthermore, it can be provided that a component which is present anyway, like the functional element 2, itself provides the permanent magnet arrangement 10. For example, it is provided in one advantageous configuration that a shaft—functional element 2—is magnetized and arranged such that, with the corresponding evaluation electronics, it forms an angle sensor 4 in accordance with the invention.

Installation is especially simple in another preferred embodiment in that the rotor 7 is pivotally supported in the angle sensor housing 24. It is advantageous that, in this way, maintenance of optionally defined distances between the stator 5 and the rotor 7 is ensured. Complete pre-installation of the angle sensor 4 is possible in this way since the angle sensor 4 constitutes an inherently closed component.

The rotor 7 preferably has a rotor housing 25 which is preferably made of at least two parts. In turn, the version in which the parts of the rotor housing 25 are clipped to one another is easy to install. The rotor housing 25 accepts the aforementioned permanent magnet arrangement 10.

The pre-mounted angle sensor 4 is clipped preferably to the functional unit 1 during installation. Attachment is also possible by means of screws which optionally provide, at the same time, for a watertight sealing of the angle sensor housing 24 due to the high holding force.

The evaluation electronics 9 are extrusion-coated in an especially preferred configuration or are potted with the angle sensor housing 24 or with another plastic component so that protection against penetrating moisture is further increased. The evaluation electronics 9 preferably comprise a board on which plug connections of the angle sensor 4 are directly soldered. The plug connections are routed to the outside through the angle sensor housing 24. The connection of the angle sensor 4 directly to the angle sensor housing 24 is thus possible.

It has already been pointed out that the description of the solution in accordance with the invention with reference to the rear hatch arrangement of a motor vehicle should be understood as being only one example. The aforementioned details especially with respect to the structural version apply identically to the arrangement with a pivoting trunk lid or a pivotable hood.

Functional units 1, such as a pivoting side door of a motor vehicle or a sliding door of a motor vehicle are also encompassed by the approach in accordance with the invention. Other preferred sample applications include a preferably motorized seat adjustment, especially seat height adjustment, or a preferably motorized window raiser of a motor vehicle.

The proposed solution can also be used in a motor vehicle lock. Here, the angle sensor 4 is assigned especially to the lock mechanism, the arrangement of the latching elements or the closing aid of the motor vehicle lock.

Finally, it is pointed out that, according to another teaching of the invention which has independent importance, lies in the coupling of the functional element 2 of a motor vehicle to the angle sensor 4 via a gearing arrangement 19. According to this further teaching, the configuration of the angle sensor 4 as a MR angle sensor 4 is not critical. The use of the gearing arrangement 19 ensures, as described above, optimum use of the measurement range of the angle sensor 4. Reference should be made to the aforementioned in this respect.

What is claimed is:

1. Functional unit of a motor vehicle, comprising:

at least one displaceable functional element, a control means for at least one of controlling and monitoring the position of the at least one functional element, an angle sensor which is coupled to the at least one functional element for determining the position thereof, and having a stator and a rotor which is pivotable relative to the stator around an axis of the angle sensor, the angle sensor producing an output signal which corresponds to a respective position of the rotor relative to the stator and the output signal being supplied to the control means, wherein the angle sensor is a magneto-resistance angle sensor, wherein the stator has evaluation electronics and the rotor has a permanent magnet arrangement, and wherein the rotor is movable relative to the stator over a measurement range within which the angle sensor produces the output signal and the measurement range comprises an angular range of at most 360°.

2. Functional unit as claimed in claim 1, wherein the measurement range comprises an angular range of at most 180°.

3. Functional unit as claimed in claim 1, further comprising a drive for displacing the functional element, the drive having a drive motor and an actuating element.

4. Functional unit as claimed in claim 3, wherein the angle sensor is coupled directly to the drive.

5. Functional unit as claimed in claim 1, wherein the functional element comprises a pivotable rear hatch.

6. Functional unit as claimed in claim 5, wherein the rear hatch movable by a drive having a drive motor, a pivotable actuating element, and a push rod which is coupled eccentrically to the actuating element.

7. Functional unit as claimed in claim 5, wherein the stator is stationary and the rotor is coupled to the rear hatch in the area of a hatch hinge.

8. Functional unit as claimed in claim 1, wherein the rotor is coupled to the functional element and the stator is stationary.

9. Functional unit as claimed in claim 1, wherein the angle sensor is coupled to the functional element via a gearing arrangement, wherein the functional element is displaceable over an adjustment range, wherein the rotor movable relative to the stator over a measurement range and wherein the gearing arrangement moves the rotor relative to the stator over at least a major part of the measurement range and at most essentially the entire measurement range when the functional element is displaced over its adjustment range.

10. Functional unit as claimed in claim 9, wherein the functional element is pivotable around a functional element axis and wherein the angle sensor axis is spaced apart from the functional element axis such that the movement of the functional element by a certain angular amount causes movement of the rotor relative to the stator by a larger angular amount.

11. Functional unit as claimed in claim 10, wherein the rotor is a lever having an end which engages an oblong hole of the functional element.

12. Functional unit as claimed in claim 10, further comprising at least one step-up gear wheel for coupling the angle sensor to the functional element.

13. Functional unit as claimed in claim 1 wherein the functional element is pivotable around a functional element axis and wherein the angle sensor axis is provided in the functional element axis.

14. Functional unit as claimed in claim 1, wherein the angle sensor has an angle sensor housing which holds the evaluation electronics.

15. Functional unit as claimed in claim 14, wherein the rotor is pivotally mounted in the angle sensor housing.

16. Functional unit as claimed in claim 1, wherein the functional element comprises one of a pivotable trunk lid, a pivotable hood and a pivotable side door of a motor vehicle.

* * * * *